US011296351B1

(12) United States Patent
Gorer et al.

(10) Patent No.: US 11,296,351 B1
(45) Date of Patent: Apr. 5, 2022

(54) RECHARGEABLE BATTERY WITH PSEUDO-REFERENCE ELECTRODE

(71) Applicant: Apple Inc., Cupertino, CA (US)

(72) Inventors: Alexander A. Gorer, Los Gatos, CA (US); William A. Braff, Palo Alto, CA (US); Steven Kaye, Oakland, CA (US); Cory R. O'Neill, Cupertino, CA (US)

(*) Notice: Subject to any disclaimer, the term of this patent is extended or adjusted under 35 U.S.C. 154(b) by 226 days.

(21) Appl. No.: 16/245,542

(22) Filed: Jan. 11, 2019

Related U.S. Application Data

(60) Provisional application No. 62/616,949, filed on Jan. 12, 2018.

(51) Int. Cl.
| | |
|---|---|
| *H01M 10/04* | (2006.01) |
| *H01M 10/48* | (2006.01) |
| *H01M 4/75* | (2006.01) |
| *H01M 4/66* | (2006.01) |
| *H01M 4/38* | (2006.01) |
| *H01M 4/02* | (2006.01) |

(52) U.S. Cl.
CPC ............ *H01M 10/04* (2013.01); *H01M 4/38* (2013.01); *H01M 4/661* (2013.01); *H01M 4/75* (2013.01); *H01M 10/486* (2013.01); *H01M 2004/021* (2013.01)

(58) Field of Classification Search
CPC ...... H01M 10/04; H01M 10/486; H01M 4/75; H01M 4/661; H01M 4/38
See application file for complete search history.

(56) References Cited

U.S. PATENT DOCUMENTS

| | | | |
|---|---|---|---|
| 5,162,169 A | 11/1992 | Tomantschger et al. | |
| 5,162,172 A | 11/1992 | Kaun | |
| 5,254,415 A | 10/1993 | Williams et al. | |
| 5,367,431 A | 11/1994 | Kunishi et al. | |
| 5,837,158 A | 11/1998 | Shepodd et al. | |
| 8,153,410 B2 | 4/2012 | Jaffe | |
| 8,163,410 B2 * | 4/2012 | Fulop .................. | G01R 31/54 |
| | | | 429/61 |
| 11,189,855 B1 | 11/2021 | O'Neill et al. | |

(Continued)

FOREIGN PATENT DOCUMENTS

| | | |
|---|---|---|
| CN | 1439180 A | 8/2003 |
| CN | 102473984 A | 5/2012 |

(Continued)

OTHER PUBLICATIONS

PCT/US2018/042598, "International Preliminary Report on Patentability", dated Feb. 6, 2020, 10 pages.

(Continued)

*Primary Examiner* — Sarah A. Slifka
(74) *Attorney, Agent, or Firm* — Kilpatrick Townsend & Stockton

(57) ABSTRACT

Energy storage devices, battery cells, and rechargeable batteries of the present technology may include an anode and a cathode. The battery cells may include a separator positioned between the anode and the cathode. The battery cells may include an electrolyte incorporated with the anode and the cathode. The battery cells may also include a pseudo-reference electrode at least partially in contact with the electrolyte. The pseudo-reference electrode may be electrically isolated from the anode and the cathode.

16 Claims, 4 Drawing Sheets

(56) References Cited

U.S. PATENT DOCUMENTS

| | | |
|---|---|---|
| 2001/0038939 A1 | 11/2001 | Bailey |
| 2005/0106456 A1 | 5/2005 | Puester et al. |
| 2006/0097701 A1 | 5/2006 | Kodama et al. |
| 2008/0187824 A1 | 8/2008 | Tomantschger |
| 2009/0068531 A1 | 3/2009 | Sawa et al. |
| 2011/0014532 A1 | 1/2011 | Knuckey et al. |
| 2011/0294007 A1 | 12/2011 | Hosaka et al. |
| 2012/0189896 A1 | 7/2012 | Zhou et al. |
| 2012/0263995 A1 | 10/2012 | Naito et al. |
| 2013/0065106 A1 | 3/2013 | Faust |
| 2014/0127542 A1 | 5/2014 | Li et al. |
| 2014/0154542 A1 | 6/2014 | Issaev et al. |
| 2014/0178735 A1 | 6/2014 | Wang et al. |
| 2015/0200393 A1 | 7/2015 | Li et al. |
| 2015/0236543 A1 | 8/2015 | Brushett et al. |
| 2015/0280259 A1 | 10/2015 | Anderson et al. |
| 2016/0049679 A1 | 2/2016 | Stevens et al. |
| 2016/0197352 A1 | 7/2016 | Blaser et al. |
| 2016/0248113 A1 | 8/2016 | He et al. |
| 2017/0133689 A1 | 5/2017 | Moore et al. |
| 2017/0250434 A1 | 8/2017 | Gennett et al. |
| 2018/0079721 A1 | 3/2018 | Armand et al. |
| 2018/0097248 A1 | 4/2018 | Nariyama et al. |
| 2018/0175427 A1 | 6/2018 | Nariyama |
| 2018/0175470 A1 | 6/2018 | Bai et al. |
| 2018/0294454 A1 | 10/2018 | Mackenzie et al. |
| 2018/0316063 A1 | 11/2018 | Masel et al. |
| 2019/0036147 A1 | 1/2019 | Yuan et al. |
| 2020/0212440 A1 | 7/2020 | Kolhekar et al. |
| 2021/0028457 A1 | 1/2021 | Newhouse et al. |

FOREIGN PATENT DOCUMENTS

| | | |
|---|---|---|
| CN | 103650216 A | 3/2014 |
| CN | 104779412 A | 7/2015 |
| CN | 107851747 A | 3/2018 |
| EP | 1125336 A1 | 8/2001 |
| EP | 2892097 A1 | 7/2015 |
| EP | 3317907 A | 5/2018 |
| EP | 3435473 A1 | 1/2019 |
| JP | 6435864 A | 2/1989 |
| JP | 0562683 A | 3/1993 |
| JP | 3522303 B2 | 5/1993 |
| JP | 2006012556 A | 1/2006 |
| JP | 2009224097 A | 10/2009 |
| JP | 5410822 B2 | 2/2014 |
| JP | 2014029818 A | 2/2014 |
| JP | 2018519646 A | 7/2018 |
| WO | 8504287 A1 | 9/1985 |
| WO | 2010111087 A1 | 9/2010 |
| WO | 2017007827 | 1/2017 |
| WO | 2018057566 A1 | 3/2018 |
| WO | 2018195372 A1 | 10/2018 |
| WO | 2018213601 A2 | 11/2018 |
| WO | 2019023010 A1 | 1/2019 |
| WO | 2019245461 A1 | 12/2019 |

OTHER PUBLICATIONS

PCT/US2020/060348, "International Search Report and Written Opinion", dated Mar. 12, 2021, 9 pages.
PCT/US2020/060350, "International Search Report and Written Opinion", dated Mar. 12, 2021, 12 pages.
Weng, et al., "Three-Electrolyte Electrochemical Energy Storage Systems Using Both Anion- And Cation-Exchange Membranes as Separators", Energy, vol. 167, Jan. 15, 2019, pp. 1011-1018.
PCT/US2018/033218, "International Preliminary Report on Patentability", dated Nov. 28, 2019, 9 pages.
Patent Application No. EP16738994.9, "Communication Pursuant to Rules 161(1) and 162 EPC", dated Mar. 23, 2018, 3 pages.
Patent Application No. JP2018-500449, "Office Action", dated Jan. 21, 2019, 12 pages.
Patent Application No. KR10-2018-7000263, "Office Action", dated Feb. 28, 2019, 5 pages.
PCT/US2016/041151, "International Preliminary Report on Patentability", dated Jan. 18, 2018, 8 pages.
PCT/US2016/041151, "International Search Report and Written Opinion", dated Aug. 25, 2016, 10 pages.
PCT/US2017/052413, "International Preliminary Report on Patentability", dated Apr. 4, 2019, 12 pages.
PCT/US2017/052413, "International Search Report and Written Opinion", dated Feb. 1, 2018, 19 pages.
PCT/US2017/052413, "Invitation to Pay Additional Fees and, Where Applicable, Protest Fee", dated Dec. 8, 2017, 14 pages.
PCT/US2018/028472, "International Search Report and Written Opinion", dated Jul. 27, 2018, 13 pages.
PCT/US2018/033218, "International Search Report and Written Opinion", dated Nov. 16, 2018, 13 pages.
PCT/US2018/042598, "International Search Report and Written Opinion", dated Oct. 2, 2018, 14 pages.
U.S. Appl. No. 16/538,660, "Non-Final Office Action", dated Feb. 16, 2021, 12 pages.
U.S. Appl. No. 16/683,088, "Non-Final Office Action", dated Sep. 2, 2021, 10 pages.
U.S. Appl. No. 16/683,091, "Non-Final Office Action", dated Aug. 18, 2021, 22 pages.
U.S. Appl. No. 16/748,586, "Non-Final Office Action", dated May 14, 2021, 12 pages.
U.S. Appl. No. 16/855,170, "Non-Final Office Action", dated Jul. 27, 2021, 13 pages.
U.S. Appl. No. 16/855,170, "Notice of Allowance ", dated Sep. 24, 2021, 9 pages.
Boeva et al., "Soluble and Highly Ionically Conducting Interpolyelectrolyte Complexes Prepared Via Chemical Template Polymerization of Aniline in the Presence of Perfluorinated Polysulfonic Acid", The Royal Society of Chemistry, vol. 4, No. 100, Oct. 2014, pp. 56677-56681.
Thuc et al., "Study on Synthesis and Characterization of Anion Exchange Membrane Based on Poly (Vinyl Alcohol) Modified by Freeradical Polymerization", International Journal of Electrochemical Science, vol. 15, Aug. 2020, pp. 8190-8199.
U.S. Appl. No. 16/538,660, "Final Office Action", dated Oct. 13, 2021, 15 pages.
U.S. Appl. No. 16/683,088, "Final Office Action", dated Oct. 12, 2021, 12 pages.
U.S. Appl. No. 16/683,088, "Notice of Allowance", dated Nov. 22, 2021, 8 pages.
U.S. Appl. No. 16/748,586, "Final Office Action", dated Nov. 15, 2021, 11 pages.

\* cited by examiner

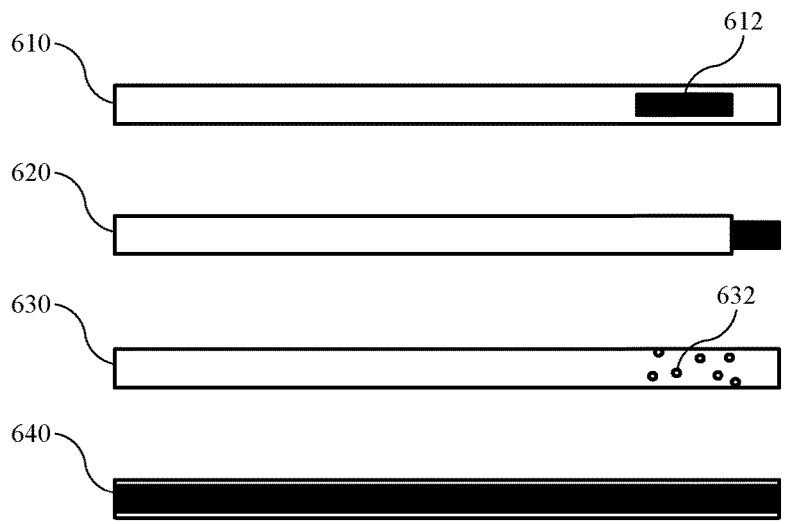
*FIG. 6*
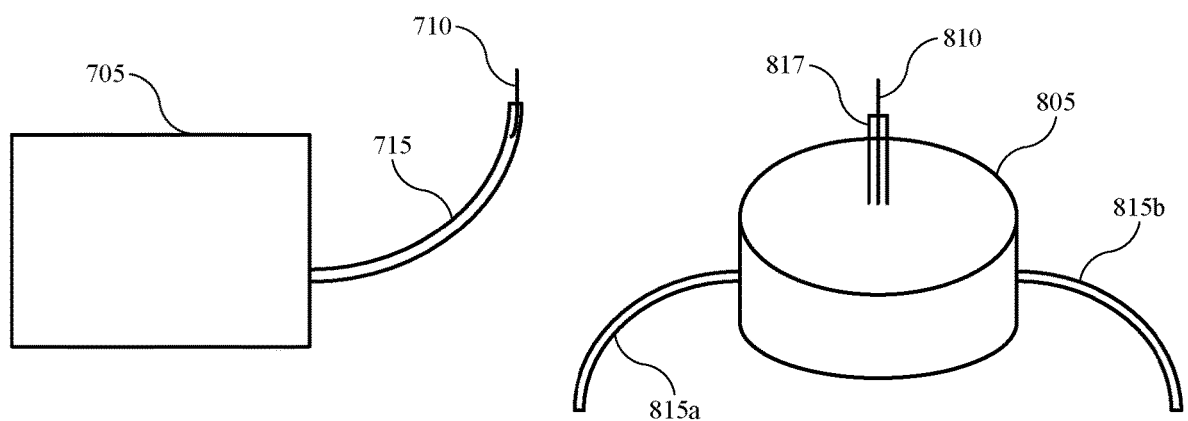
*FIG. 7*  *FIG. 8*

RECHARGEABLE BATTERY WITH PSEUDO-REFERENCE ELECTRODE

CROSS-REFERENCE TO RELATED APPLICATION

This application claims the benefit of U.S. Application Ser. No. 62/616,949, filed Jan. 12, 2018, the entire disclosure of which is hereby incorporated by reference for all purposes.

TECHNICAL FIELD

The present technology relates to batteries and battery components. More specifically, the present technology relates to reference electrode incorporation in rechargeable battery cell designs.

BACKGROUND

In rechargeable batteries, routine cell cycling may cause issues with electrodes or cell performance over time. Many conventional configurations measure cell potential as a difference in potential between an anode and a cathode, which may obscure the specific cause of issues within the cells. Improved designs are needed.

SUMMARY

The present technology relates to energy storage devices, including battery cells and batteries, which may include zinc alkaline batteries or lithium-ion batteries having a variety of shapes including wound cells and stacked cells, which may be or include bipolar batteries as well as batteries stacked in any orientation including vertical and horizontal, for example. These devices may include current collectors configured based on a z-direction transmission of current through the cell components, although current collectors configured based on an xy-directional transmission of current may also benefit from the present designs, as well as wound, cylindrical, prismatic, and other battery configurations. The cells may include a host of features and material configurations as will be described throughout this disclosure.

Energy storage devices, battery cells, and rechargeable batteries of the present technology may include an anode and a cathode. The battery cells may include a separator positioned between the anode and the cathode. The battery cells may include an electrolyte incorporated with the anode and the cathode. The battery cells may also include a pseudo-reference electrode or a plurality of reference electrodes at least partially in contact with the electrolyte. The pseudo-reference electrode may be electrically isolated from the anode and the cathode.

In some embodiments, the pseudo-reference electrode may include a metal wire positioned within the rechargeable battery. The metal wire may be nickel or tungsten. The pseudo-reference electrode may be characterized by a voltage drift of less than or about 5 mV/day. The pseudo-reference electrode may be characterized by a thickness less than or about 0.2 mm. The pseudo-reference electrode may be coated with a polymeric material. The polymeric material may be configured to afford distribution of hydroxide ions across the polymeric material to contact the metal wire. The battery cell may include a window defined by the polymeric material to expose a portion of the metal wire. The anode may include a zinc-containing material, and the cathode may include a manganese-containing material, a nickel-containing material, or a silver-containing material. The electrolyte may include a solution of KOH characterized by a pH greater than or about 12.

The present technology may also encompass battery cells that may include a housing, an anode active material, a cathode active material, and a separator positioned between the anode active material and the cathode active material. The battery cells may also include an electrolyte incorporated with the anode active material and the cathode active material. The battery cells may include a pseudo-reference electrode at least partially in contact with the electrolyte. The pseudo-reference electrode may be a metal electrically isolated from the anode active material and the cathode active material.

In some embodiments he pseudo-reference electrode may be positioned adjacent the housing. The housing may be or include a pouch of a polymeric material, and the pseudo-reference electrode may be incorporated within the polymeric material. The pseudo-reference electrode may be positioned within one of the anode active material or the cathode active material. The pseudo-reference electrode may be positioned between layers of the separator. The metal of the pseudo-reference electrode may be selected from the group consisting of platinum, gold, nickel, iridium, palladium, titanium, or tungsten. The pseudo-reference electrode may be coated with a polymeric material to electrically isolate the pseudo-reference electrode from the anode active material and the cathode active material. The polymeric material may be stable at environmental conditions above or about 14 pH.

The present technology may also encompass battery cells including a housing, an anode active material, a cathode active material, and a separator positioned between the anode active material and the cathode active material. The battery cell may include an electrolyte incorporated with the anode active material and the cathode active material. The battery may include a first pseudo-reference electrode at least partially in contact with the electrolyte. The first pseudo-reference electrode may be positioned proximate the cathode active material. The battery cell may also include a second pseudo-reference electrode at least partially in contact with the electrolyte. The second pseudo-reference electrode may be positioned proximate the anode active material. The battery cell may also include a third pseudo-reference electrode at least partially in contact with the electrolyte. The third pseudo-reference electrode may be positioned adjacent the housing or between layers of the separator. The first pseudo-reference electrode and the second pseudo-reference electrode may be coated with a hydroxide-conducting polymer.

Such technology may provide numerous benefits over conventional technology. For example, an incorporated reference electrode according to the present technology may be capable of incorporation within commercial battery cells. Additionally, the designs may allow an increased operating window for the battery cells by providing enhanced tracking of the internal processes occurring. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

FIG. 6 shows exemplary reference electrodes that may be incorporated in battery cells according to embodiments of the present technology.

FIG. 7 shows a schematic reference electrode that may be incorporated in battery cells according to embodiments of the present technology.

FIG. 8 shows a schematic reference electrode coupling with multiple cells according to embodiments of the present technology.

Figure 1:
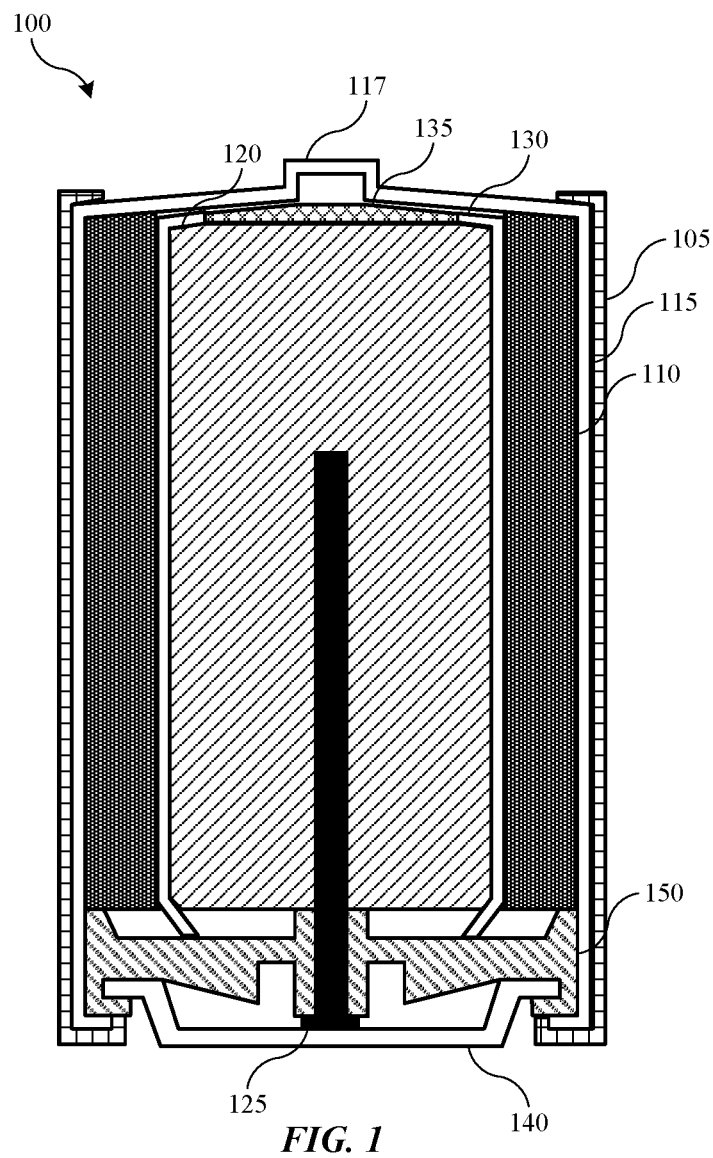
FIG. 1 shows a schematic cross-sectional view of an energy storage device according to some embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

A goal of monitoring within a cell environment may include identifying the potential difference at an interface of electrodes and the electrolyte. However, this may not be measureable, and instead conventional technologies will measure two interfaces, one at the cathode and one at the anode, and utilize the delta of these numbers to determine cell potential relative to a ground electrode. However, during operation of the cell, including charging and discharging, the difference may be changing dynamically as well as the grounded electrode itself. Accordingly, by measuring a difference between the two electrodes, it may be difficult to determine a source causing changes in the difference, or whether the difference is indeed occurring relative to ground. For example, by measuring the difference, identifying a problem with an individual electrode may not be feasible. Moreover, if both electrodes are drifting simultaneously, the potential difference may not change, and problems occurring within the cell may not be identified.

Reference electrodes can be incorporated within a cell to aid with measurements. The purpose of a reference electrode is to measure a constant voltage at the electrolyte by which a point of comparison may be made with the active electrodes. However, reference electrodes are generally not included in commercial cells for a number of reasons. During testing or research endeavors, a reference electrode may be incorporated within a test setup to provide additional monitoring within the cell. Reference electrodes often include a metal, such as mercury or silver, for example, with some electrolyte around it. This electrolyte is often different from the electrolyte of the operational cell, and is separated from the cell by a microporous barrier or diffusion barrier on the reference electrode. This barrier allows the reference electrode to be in ionic conductivity with the electrolyte, while limiting any electrical contact or chemical reaction with the reference electrode and the active electrodes. The problem with these conventional reference electrodes is that they may be up to an inch in diameter, and subject to degradation over time requiring replacement. Although such replacement and size may be acceptable in a testing environment, they are prohibitive in a commercial cell that may be sealed and incapable of modification. These reference electrodes may also have a prohibitive cost associated with their inclusion. Consequently, conventional commercial cells are often limited in their diagnostic abilities.

The present technology overcomes these issues by incorporating a pseudo-reference electrode within the battery cell. Unlike the conventional reference electrodes, the pseudo-reference electrode may be a filament placed in direct contact with the cell electrolyte, while being maintained electrically isolated from the anode and cathode of the cell. These reference electrodes according to some embodiments of the present technology may allow collection of additional diagnostic information and enhanced accuracy within the cell, which may provide a host of benefits discussed below. After describing battery and cell designs utilizing the present technology, the disclosure will discuss a variety of embodiments incorporating these pseudo-reference electrodes.

Although the remaining portions of the description will routinely reference batteries with an alkaline electrolyte, it will be readily understood by the skilled artisan that the technology is not so limited. The present designs may be employed with any number of battery or energy storage devices, including other rechargeable and primary, or non-rechargeable, cell types, as well as electrochemical capacitors also known as supercapacitors or ultracapacitors, electrolysers, fuel cells, and other electrochemical devices. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

FIG. 1 shows a schematic cross-sectional view of an energy storage device 100 according to embodiments of the present technology. FIG. 1 illustrates a cylindrical battery, which may be an alkaline battery in embodiments. It is to be understood that the battery form is exemplary, and other wound or layered batteries may include similar components including pouch or prismatic cells, or cells with both terminals accessible from a single surface, which may similarly be used with the present technology. Energy storage device 100 may include an outer casing 105 that contains the components of energy storage device 100. Within outer casing 105 may be a cathode active material 110, which may be in contact with a cathode current collector 115. Cathode current collector 115 may be coupled with an additional conductive element, or may form positive terminal 117 of energy storage device 100. Cathode current collector 115 may be stainless steel, or some other conductive material suitable for electronic transmission. Energy storage device 100 may also include an anode active material 120, which may be in contact with an anode current collector 125.

Anode current collector 125 may form or be coupled with an additional conductive element forming negative terminal 140. Anode current collector 125 may be brass, or some other conductive material suitable for electronic transmission. A separator 130 may be positioned between cathode active material 110 and anode active material 120 to prevent short circuiting between the materials. A portion of separator 130 or a separate insulator 135 may be positioned connected with the separator 130 to further limit contact of the negative anode material 120 with the positive terminal 117. Additionally, an insulator 150 may be positioned between the anode current collector 125 and the cathode active material 110 and the cathode current collector 115. Insulator 150 may be composed of a flexible material to allow gas expansion within the cell during operation.

In embodiments, energy storage device 100 may be an alkaline battery or battery cell, and may include any number of materials associated with such cells. For example, anode active material 120 may include metals or metal-containing material, such as materials including poor metals including group 12, 13, 14, and 15 metals, including aluminum, cadmium, mercury, or zinc, for example. Cathode active material 110 may include materials including transition metals including manganese, nickel, or silver in any form. For example, cathode compounds may include manganese dioxide, including alpha, beta, delta, or gamma manganese dioxide. Exemplary compounds may also include nickel hydroxide, including alpha or beta nickel hydroxide, and nickel oxide hydroxide. Exemplary compounds may also include silver hydroxide, among other metal oxides or hydroxides. Cathode active material 110 may also include a mixture of materials including a carbon-containing material. Separator 130 may include a polymeric material such a polyolefin, including polyethylene or polypropylene. The separator 130 may also include a cellulosic material or a paper. Energy storage device 100 may include a potassium hydroxide electrolyte, which may be a concentrated aqueous solution. Although included as an electrolyte, the potassium hydroxide may not be involved in the cathode and anode reactions, which may produce balanced amounts of hydroxide. Separator 130 may allow hydroxide ions and water to diffuse across the separator 130, while limiting electrical transmission.

Figure 2:
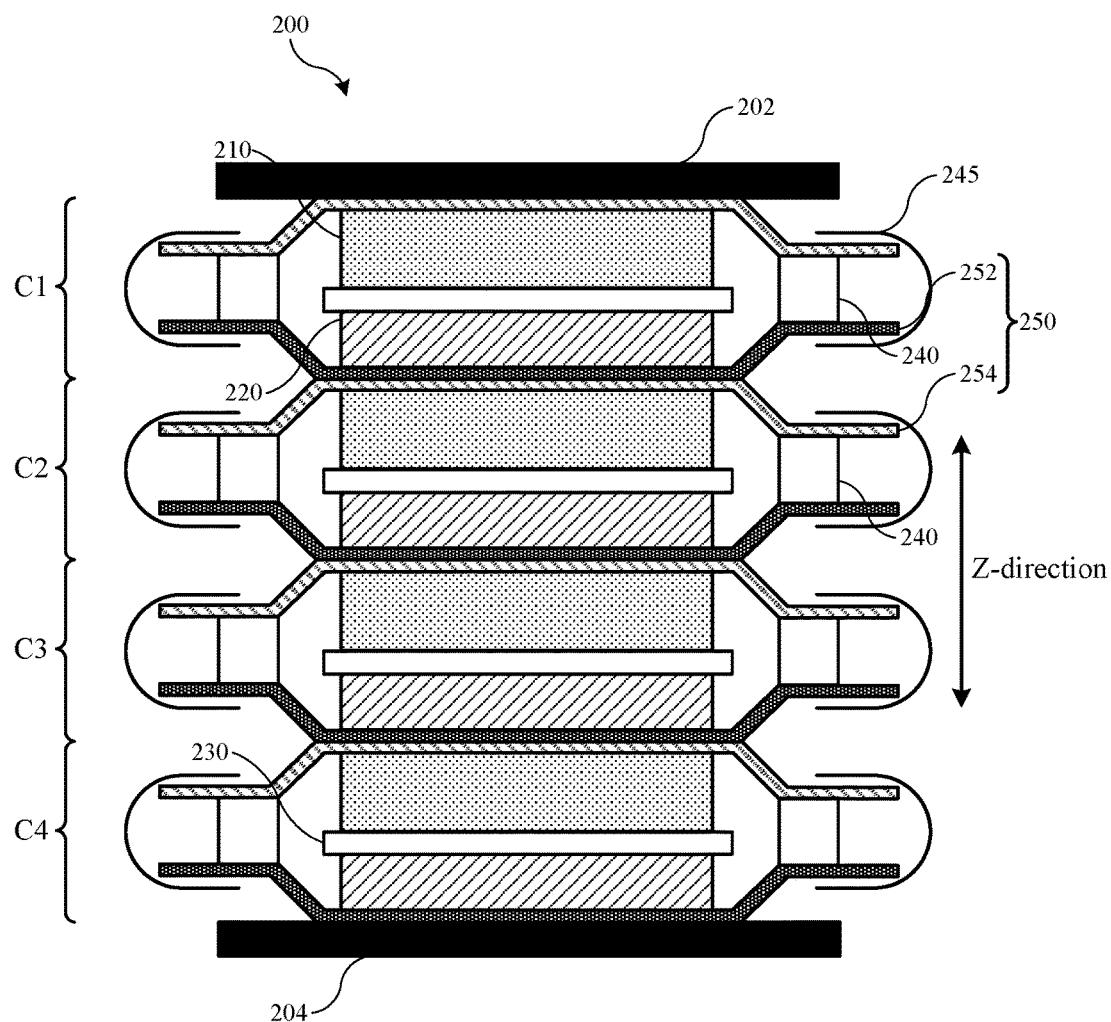
FIG. 2 shows a schematic cross-sectional view of an energy storage device according to some embodiments of the present technology.

FIG. 2 depicts a schematic cross-sectional view of another energy storage device according to embodiments of the present technology. The energy storage devices may include a single current collector or coupled current collectors. The energy storage devices may operate in a conventional manner for a stacked battery with regard to electronic flow across or through material layers, such as providing electronic mobility across an xy-plane of the current collectors. Additionally, the described devices may operate by electronic flow through the structure in a z-direction through individual cells as opposed to via tabbed current collectors laterally disposed on the current collectors of conventional batteries.

As illustrated, the stacked battery 200 may include a stack of electrochemical cells C1, C2, C3, and C4 between end plates 202 and 204. End plates 202 and 204 may be metal current collector plates, which can serve both electrical and mechanical functions. In some embodiments, end plates 202 and 204 can be support plates that form part of an external housing of the stacked battery. End plates 202 and 204 may also provide mechanical support within a housing of the stacked battery. Some or all of the support plates may be electrically conductive, and there may be a terminal within the support plate that is electrically connected to the end plate. In embodiments an additional plate similar to end plates 202 and 204 may be disposed within the stack of cells, such as between two cells. This configuration including an additional plate may provide structural rigidity, and the additional plate may also perform electronic functions similar to end plates 202, 204. End plates 202 and 204 may act as positive and negative terminals of the battery. The cells may pass current in the z-direction through individual cells to the end plates, which may transfer current in any direction across the plate and from the battery.

The stack of electrochemical cells may include any number of electrochemical cells depending on the selected voltage for the stacked battery 200, along with the individual voltage of each individual electrochemical cell. The cell stack may be arranged with as many or as few electrochemical cells in series as desired, as well as with intervening plates for support and current transfer. The cells C may be positioned adjacent, e.g. abutting, one another in some configurations. Each electrochemical cell C may include a cathode 210 and an anode 220, where the cathode 210 and anode 220 may be separated by separator 230 between the cathode and anode. Between the anode 220 of cell C1 and the cathode of adjacent cell C2 may be a stacked current collector 250. The stacked current collector 250 may form part of C1 and C2. On one side, stacked current collector 250 may be connected to the seal 240 of C1 and connected on an opposing side to the seal 240 of C2.

In some embodiments, as shown in FIG. 2, stacked current collector 250 may include a first current collector 252 and a second current collector 254. In embodiments one or both of the current collectors may include a metal or a non-metal material, such as a polymer or composite. As shown in the figure, in some embodiments the first current collector 252 and second current collector 254 can be different materials. In some embodiments, the first current collector 252 may be a material selected based on the potential of the anode 220, such as copper or any other suitable metal, as well as a non-metal material including a polymer. The second current collector may be a material selected based on the potential of the cathode 210, such as aluminum or other suitable metals, as well as a non-metal material including a polymer. In other words, the materials for the first and second current collectors can be selected based on electrochemical compatibility with the anode and cathode active materials used.

The first and second metal layers can be made of any material known in the art. For example, copper, nickel, aluminum, or stainless steel may be used, as well as composite materials having metallic aspects, and non-metallic materials including polymers. In some instances the metals used in the first and second metal layer can be the same or different. The materials selected for the anode and cathode can be any suitable battery materials. For example, the anode material can be silicon, graphite, carbon, a tin alloy, lithium metal, a lithium containing material, such as lithium titanium oxide (LTO), or other suitable materials that can form an anode in a battery cell. Additionally, for example, the cathode material can be a lithium-containing material. In some embodiments, the lithium-containing material can be a lithium metal oxide, such as lithium cobalt oxide, lithium manganese oxide, lithium nickel manganese cobalt oxide, lithium nickel cobalt aluminum oxide, or lithium titanate, while in other embodiments, the lithium-containing material can be a lithium iron phosphate, or other suitable materials that can form a cathode in a battery cell.

The first and second current collectors may have any suitable thickness, and may have a thickness that allows for a seal to be formed and provides suitable mechanical stability to prevent failure, such as breakage of the layers, during anticipated usage of the stacked battery. Additionally, the thickness of the current collectors can be sufficiently thin to allow for bending and flexing in the separation region to accommodate expansion anticipated during cycling of the stacked battery, including, for example, up to 10% expansion in the z-direction.

Figure 3:
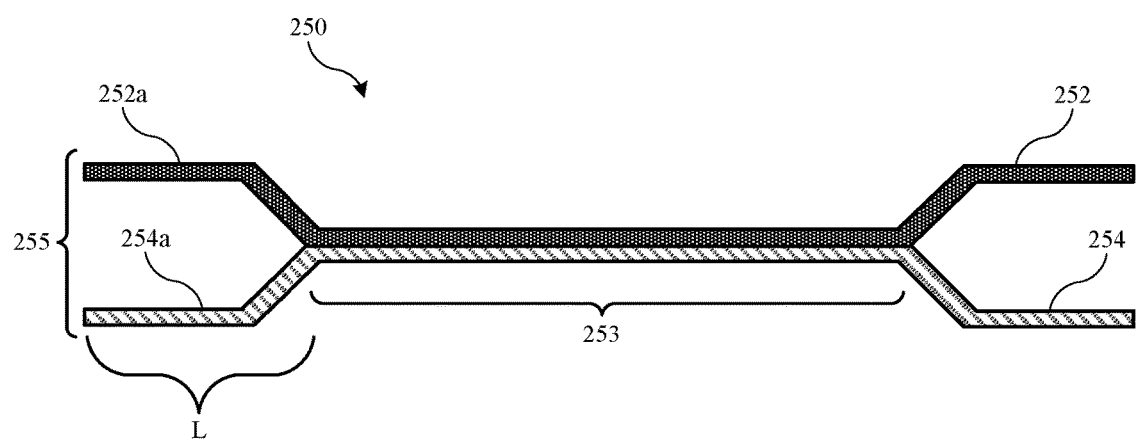
FIG. 3 shows a schematic cross-sectional view of a current collector according to some embodiments of the present technology.

Turning to FIG. 3, the stacked current collector 250 may have a connection region 253 where the first current collector 252 and second current collector 254 may be connected, and a gap region 255 at the peripheral ends of the collector 250. In the connection region 253, the first current collector and second current collector may be in direct contact or otherwise joined to be electrically-conductive. In some embodiments, the first current collector and second current collector may be directly connected, while in other embodiments the first current collector and second current collector may be indirectly connected via a conductive material. To form the connection region 253, the first current collector 252 and the second current collector 254 may be laminated together. Additionally, the connection region 253 may be created by welding the first current collector 252 and the second current collector 254 together. The connection region 253 may also be created by using an adhesive, which may be electrically conductive, between the first current collector 252 and the second current collector 254. In other embodiments, the connection region 253 may be created by the wetting that can occur between the materials of the first current collector 252 and the second current collector 254.

In the gap region 255, the peripheral ends of the first current collector 252 and the second current collector 254 may be spaced apart and moveable relative to each other. As such, there may be a separation distance between the first and second current collectors, which may increase as the electrochemical cell swells. In some embodiments, the spaced apart peripheral ends of the first current collector 252 and the second current collector 254 may be of a length that is sufficient to accommodate an anticipated expansion of the individual electrochemical cells of the stacked battery during cycling of the battery. The peripheral ends of the current collectors 252a and 254a may have a length L, as shown in FIG. 3, which may be long enough that up to or at least about 10% expansion in the z-direction can be accommodated.

As shown in FIG. 2, each cell C1, C2, C3, and C4, also includes a seal 240, which, with the current collector layers, may electrochemically isolate the electrochemical cells from each other. Thus, each cathode-anode pair may be electrochemically sealed and isolated from neighboring electrochemical cells. Because the current collectors 252 and 254 may be separated at the peripheral ends, separate seals 240 can be formed on opposing sides, such as a top and bottom, of the stacked current collector 250. The seals 240 may be the same or different materials, and each seal 240 may also be a laminate, composite, or coupling of two or more materials in embodiments.

The seal material may be able to bond with the first and second layers of the stacked current collector to prevent electrolyte leakage. The seal material may be a polymer, an epoxy, or other suitable electrically-insulating material that can bond with first and second current collectors to create a seal, which may be a hermetic seal. In some embodiments, the polymer may be polypropylene, polyethylene, polyethylene terephthalate, polytrimethylene terephthalate, polyimide, or any other suitable polymer that may bond with the first and second current collectors of the stacked current collector to form a hermetic seal and may also provide resistance to moisture ingress. The electrolyte may be a solid, a gel, or a liquid in embodiments. The seal may electrochemically isolate each electrochemical cell by hermetically sealing the cell, thereby preventing ions in the electrolyte from escaping to a neighboring electrochemical cell. The seal material may be any material providing adequate bonding with the metal layers such that the seal may be maintained through a predetermined period of time or battery usage.

The separator may be wetted with the electrolyte, such as a fluid electrolyte or gel electrolyte, to incorporate the electrolyte into the stacked battery. Alternatively, a gel electrolyte may coat the separator. In still further alternatives, a gel electrolyte may coat the first metal layer and/or second metal layer before combination. Additionally, the electrolyte may be blended with particles of electrode active material. In various embodiments, incorporating the electrolyte into the components of the stacked battery may reduce gassing in the stacked battery. In variations that include a flexible seal, the stacked battery may accommodate gas resulting from degassing.

The individual electrochemical cells may be formed in any suitable manner. In some embodiments, the cathode 210, the anode 220, and the separator 230 may be preassembled. A first current collector 252 may then be connected to the anode while a second current collector 254 may be connected to the cathode to create a cell. The seal material may be disposed between the first current collector 252 and the second current collector 254 to form seals 240. Finally, the peripheral ends of the sealed electrochemical cell may be further taped to frame the cell. Tapes 245, as well as other coatings, sealing, or material layers, may be disposed around the outer perimeter of the metal layers and seals. The tape 245 may be substituted with ceramic or polymeric materials. Tape 245 may be included for various reasons including to prevent shorting to adjacent layers or to surrounding conductive surfaces within the device, to provide improved electrochemical or chemical stability, and to provide mechanical strength.

FIGS. 2 and 3 illustrate an exemplary stacked battery design according to the present technology. Additional configurations other than illustrated, or as variations on the designs, are also encompassed by the present technology. For example, certain embodiments may not include an additional seal material, and first current collector 252 and second current collector 254 may be directly coupled or bonded together. Additionally, the current collectors may include additional designs including combinations of polymer material and conductive materials, such as within a matrix.

An exemplary matrix for a current collector may include a polymer disposed as the matrix material or as part of the matrix material. The matrix may provide an insulative design that limits or reduces xy-directional conductivity. The polymer matrix may be developed with a conductive material to produce a current collector having particular electrochemical or composite properties, such as electrical conductivity in the z-direction or through the cell. For example, conductive particulate material may be incorporated within the matrix. The conductive material may include any of the conductive materials previously identified. In embodiments, the conductive material may include one or more of silver, aluminum, copper, stainless steel, and a carbon-containing material. In this way, the current collector may have a tuned resistivity to provide directional control for electrical conductivity. For example, the produced current collector may be configured to provide an in-plane resistivity across a length in the xy-plane, as well as a through-plane resistivity in the z-direction, which is greater than or about $1\times10^{-4}$ ohm-m in embodiments. Additionally, exemplary current collectors may have an in-plane and through-plane resistivity of between about $1\times10^{-3}$ ohm-m and about 1,000 ohm-m.

Figure 4:
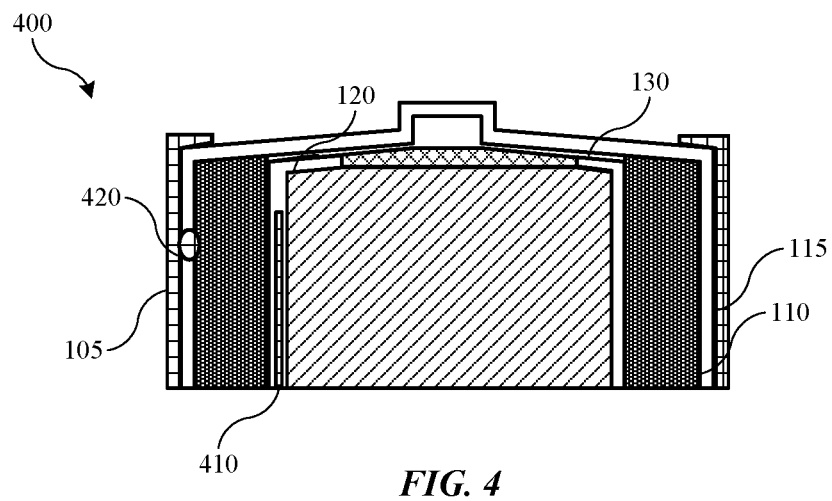
FIG. 4 shows a schematic cross-sectional view of a portion of an energy storage device according to some embodiments of the present technology.

Turning to FIG. 4 is shown a schematic cross-sectional view of a portion of an energy storage device 400 according to embodiments of the present technology. In embodiments energy storage device 400 may be a battery, or may be one of multiple battery cells incorporated within a battery similar to those discussed above with regard to FIGS. 1 and 2, as well as other battery designs including wound or prismatic cells. Energy storage device 400 is shown as a battery having a single battery cell, but it is to be understood that energy storage devices encompassed by the present technology may include one or more cells up to hundreds or thousands of coupled cells in some multi-cell battery designs. Energy storage device 400 may illustrate a portion of a battery or battery cell similar to FIG. 1, and the cell may include any of the components previously discussed.

The cell of energy storage device 400 may include electrode components. An anode active material 120 may be disposed within device 400, such as along an interior portion as illustrated. Additionally, a cathode active material 110 may be disposed on or contact first current collector 115, which may be proximate the cell housing or outer casing 105. Exemplary cells may also include a separator 130 disposed or positioned between anode active material 120 and cathode active material 110. The active materials may constitute the anode and cathode electrodes of the battery cells including with the respective current collectors. An electrolyte may be included in the cell, and may saturate the components, or may be fully absorbed within the components so that the electrolyte may not be free-flowing within the cell. Depending on the cell design, the amount of electrolyte may also be included to create a starving state within the cell in which components of the cell may not be fully saturated with electrolyte, and pores or pockets may exist in the cell in which no electrolyte may be located. The components may be any of the materials discussed previously. Energy storage device 400 may also include a reference electrode 410, which may be a pseudo-reference electrode as previously discussed, and that is at least partially in contact with the electrolyte within the cell. Reference electrode 410 may be electrically isolated from the anode active material 120 and the cathode active material 110 in order to operate at open-circuit voltage within the cell, and without current flow through the reference electrode 410.

In energy storage device 400, the anode active material 120 may be or include any of the materials previously described in FIGS. 1 and 2, and in embodiments may include zinc or a zinc-containing material. Additionally, cathode active material 110 may be or include any of the materials previously described in FIGS. 1 and 2, and in embodiments may include a manganese-containing material, including an oxide of manganese such as manganese dioxide. Manganese dioxide may be characterized by a number of forms, and may include alpha manganese dioxide, beta manganese dioxide, gamma manganese dioxide, and delta manganese dioxide. The material may also include many of the other elements included in these materials, which may include, for example, lead, potassium, barium, boron, or iron. As noted above, energy storage device 400 may also include an electrolyte, which may have alkaline characteristics including a pH of above 7. The electrolyte may include water and potassium hydroxide and may be characterized by a hydroxide ion concentration of up to or about 0.5 M, up to or about 1 M, which may be equivalent to a pH of 14, up to or about 2 M, up to or about 3 M, which may be equivalent to a pH approaching 14.5, up to or about 5 M, up to or about 7 M, up to or about 10 M, which may be equivalent to a pH of 15, or higher.

Reference electrode 410 may be or include a metal or metal alloy wire positioned within the energy storage device at any number of locations, such as in the plane of one of the electrodes or between the electrodes. For example, reference electrode 410 is illustrated as positioned within separator 130, and may be positioned within layers of separator 130 to maintain electrical isolation from the anode and cathode active materials. When positioned within the cell at a location in which the reference electrode is not in contact with the active materials, reference electrode 410 may be a metal wire or filament by which a potential within the cell may be measured. The metal may be any metal or alloy that is compatible with the electrolyte of the device. For example, most conventional reference electrodes discussed above are based on an acidic or neutral environment. If placed in an alkaline environment, the reference electrode may corrode, such as silver-based reference electrodes, for example, or other common reference electrode designs. Accordingly, the wire reference electrode according to some embodiments of the present technology may be selected based on stability in an alkaline environment. Certain metals that may be utilized for reference electrode 410 may include platinum, gold, nickel, iridium, palladium, titanium, or tungsten. Additionally, embodiments may include alloys or combinations of metals to provide stability in the environment as well as to limit any chemical reaction with other materials within the cell.

By utilizing a metal wire as the reference electrode 410, without including a separate electrolyte for the reference electrode such as with conventional designs, reference electrode 410 may be a pseudo-reference electrode operating in the cell electrolyte. By utilizing a pseudo-reference electrode, a number of benefits may be afforded. For example, because a casing environment with a diffusion barrier to separate the cell electrolyte from the reference electrode electrolyte may not be included, the bulk related to conventional reference electrodes may be avoided. Because the reference electrode may include a single wire, the reference electrode may be characterized by reduced dimensions capable of use within the smaller commercial batteries used in many devices. For example, the reference electrode 410 may be characterized by a thickness of less than or about 0.5 mm, and may be characterized by a thickness of less than or about 0.3 mm, less than or about 0.2 mm, less than or about 0.1 mm, less than or about 80 µm, less than or about 60 µm, less than or about 50 µm, less than or about 40 µm, less than or about 30 µm, less than or about 20 µm, or less in embodiments.

Pseudo-reference electrodes according to some embodiments may be characterized by drift in readings based on being included in the environment of the cell, unlike some conventional reference electrodes. In some embodiments, reference electrode 410 may be characterized by a voltage drift of less than or about 10 mV/day, and may be characterized by a voltage drift of less than or about 8 mV/day, less than or about 6 mV/day, less than or about 5 mV/day, less than or about 4 mV/day, less than or about 3 mV/day, less than or about 2 mV/day, less than or about 1 mV/day, or less.

One or more reference electrodes may be placed within or about a cell in some embodiments. For example, a pseudo-reference electrode 420 may be positioned adjacent the housing, or be incorporated with or within the housing 105. For example, in some embodiments the housing may be cell walls for incorporating other components as discussed above, and which may include a pouch made of any of the previously noted materials. The pouch may be or include a polymeric material, including any of polymeric materials described elsewhere, such as for separator materials where materials including polypropylene may be utilized. A pseudo-reference electrode may be molded directly with or within the pouch material in some embodiments. The pseudo-reference electrode material may extend through the housing polymeric material, or a window may be formed within the polymeric material affording access to the electrolyte for the pseudo-reference electrode. When insert-molded into housing materials, additional consistency may be provided for manufacturing operations, where a constant location or position for the reference electrode may occur.

Figure 5:
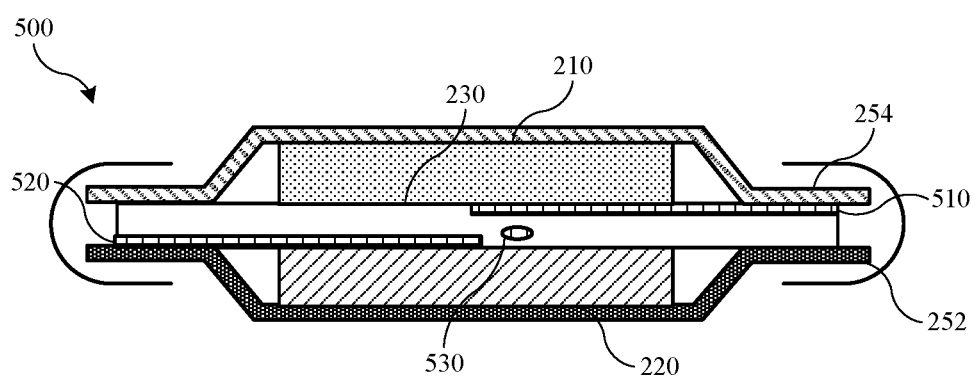
FIG. 5 shows a schematic cross-sectional view of a portion of a battery cell according to some embodiments of the present technology.

In some embodiments one or more reference electrodes may be included within the cell. FIG. 5 illustrates a schematic cross-sectional view of a portion of a battery cell 500 according to embodiments of the present technology. Battery cell 500 may be similar to battery 200 discussed above, and may include similar components. For example, battery cell 500 may include a first current collector 252, and a second current collector 254. An anode active material 220 may be disposed on or in contact with first current collector 252, and a cathode active material 210 may be disposed on or in contact with second current collector 254. The current collectors and active materials may be any of the materials discussed above with regard to FIG. 2. A separator 230 may be disposed between the anode active material 220 and the cathode active material 210.

One or more reference electrodes may also be included within the battery cell 500. The reference electrodes may be any of the materials discussed previously with regard to reference electrode 410, and the reference electrodes may each be a pseudo-reference electrode as previously described. For example, multiple reference electrodes may be positioned in different locations within the cell to provide multiple monitoring locations, and any number of reference electrodes may be included. As illustrated, a first reference electrode 510 may be positioned proximate the cathode active material 210. In some embodiments the first reference electrode may be positioned embedded within the cathode active material. A second reference electrode 520 may be positioned proximate the anode active material 220. In some embodiments the second reference electrode may be embedded within the anode active material. When the reference electrodes are included proximate, in contact with, or embedded in the anode or cathode active materials, the reference electrodes may be coated in one or more ways, to ensure the reference electrode remains electrically isolated from the active electrodes of the system. Coating materials are discussed further below.

Additional reference electrodes may also be included within the cell. For example, a third reference electrode 530 may be positioned within the separator, or may alternatively be placed elsewhere within the cell, such as adjacent or within outer housing as discussed above, proximate seal regions, or elsewhere within the cell where the reference electrode may be in contact with electrolyte, while being electrically isolated from the anode and cathode. Third reference electrode 530 is illustrated in a different orientation from the first reference electrode and the second reference electrode, and may be oriented perpendicular to the other reference electrodes. In embodiments, any of the reference electrodes may be positioned in any orientation within the cell. Additionally, each of the reference electrodes may be any of the materials previously described, and may be the same or different materials from any of the other reference electrodes included within a cell.

Utilizing a pseudo-reference electrode according to some embodiments of the present technology may cause certain volatility in the readings from the reference electrode. Although most of the noise may be from a reaction occurring with the reference electrode or temperature gradients within the cell, some of the noise may be from operational changes within the cell. For example, as temperature changes within the cell, which may occur during operational charging or discharging, the voltage registered by the reference electrode may change. However, in some embodiments, this change may be incorporated into the battery management system of the device or cell to account for the change and maintain a stable reading for potential. For example, a thermocouple may also be included in the cell or battery housing that may register real-time adjustments in temperature. This information may be an input into the battery management controls along with the reading from the reference electrode to adjust the calculation for the potential.

For example, the battery management system may calculate the potential based on a version of the Nernst equation that includes specific information about the cell environment and the material used for the reference electrode. By also measuring the temperature in the cell, the battery management system may provide more precise potential results by adjusting the determined cell potential based on the real-time temperature. This may provide more precise measurements at any of the electrodes or within the system. By providing more accurate measurements of cell potential, a lower margin of error may be applied to the cell operation. For example, many cells may not be operated from fully discharged to 100% charged because of the possibility of overcharging based on imperfect measurements and other conditions. Consequently, the cell may be operated to some level less than full capacity, such as 90% charge, as a non-limiting example. Utilizing the present technology, however, may provide more precision in determining proximity to capacity thresholds, and a similar cell utilizing the present technology may, again as a non-limiting example, be operated up to 95% based on the confidence of the measurements and calculations being performed. Based on the calculations performed, the battery management system may continue to charge or discharge a cell longer than in conventional configurations, for example.

As noted above, some volatility in the reading may be due to reactions that may occur within the cell as well as temperature gradients within the cell, among other items that may affect the reading of the reference electrode. Accordingly, in some embodiments one or more coatings may be applied to the reference electrode. As noted above, the coatings may limit electrical interaction of the reference electrode with the anode and cathode. The coatings may also limit the area of the reference electrode that interacts with the cell environment, which may improve accuracy of measurements within the cell.

FIG. 6 illustrates exemplary reference electrodes that may be incorporated in battery cells according to embodiments of the present technology. The reference electrodes may be included in any of the batteries or cells discussed previously, and illustrate non-limiting examples of possible reference electrode characteristics that may be considered based on, for example, where the reference electrode may be positioned within the cell. It will be understood that the illustrated reference electrodes are merely examples, and any number of variations on these configurations are similarly encompassed by the present technology.

The coatings utilized on the reference electrodes may include a number of polymeric or other inert materials capable of existing in any of the alkaline environments previously described. The coatings may provide an electrical insulation to the reference electrode across a majority of the surface of the reference electrode. Exemplary materials may include fluoropolymers that may be stable within the cell environment, and may limit formation of cell material on the reference electrode. The coating may include perfluoroalkoxy alkanes, as well as other polymeric materials that may include polytetrafluoroethylene, fluorinated ethylene propylene, among other materials that may be inert within the electrolyte, and may provide an electrical insulation about portions of the reference electrode. For example, the reference electrode may be coated to allow a window of exposure of the reference electrode, as illustrated with reference electrode 610. Window 612 may be formed in a single location as illustrated, or several such windows may be formed across the reference electrode. For example, when the reference electrode is positioned proximate one of the active materials, the window 612 may be positioned away from the active material to prevent contact between the active electrode and the reference electrode.

An additional reference electrode design may include a partial coverage of a reference electrode 620, in which a portion of the reference electrode is exposed. For example, temperature gradients, pH gradients, or other gradients within the cell may affect the reading of the reference electrode. By exposing only a portion of the reference electrode, a reading may be made from a localized position within the cell. Configurations such as reference electrode 620 may be used when partial exposure of the reference electrode may be acceptable, such as when the reference electrode is positioned adjacent the housing or between layers of the separator, and the reference electrode is not exposed to the active materials. Similarly, reference electrode 630 illustrates apertures 632 defined in portions of the coating to provide a partial exposure of the reference electrode for measurements.

Reference electrode 640 illustrates an embodiment in which a membrane is formed about the reference electrode, and may completely encapsulate the reference electrode. Unlike the other coatings, in which a portion of the reference electrode remains exposed to allow measurements, the membrane may allow diffusion through the membrane, while maintaining electrical insulation for the reference electrode. The membrane may be a polymeric material, and may be used in situations in which the reference electrode may be in contact with or embedded within the active materials. The polymeric material may be characterized by a net neutral charge in the bulk, and may be a polymer characterized by a cationic backbone and may include one or more nitrogen-containing moieties in the structure. The backbone may include a hydrocarbon and/or a nitrogen-containing structure, or may include a derivative or benzene, such as styrene, or one or more polyolefin structural segments including one or more nitrogen-containing or other functional groups. Exemplary functional groups or moieties that may be incorporated within the structure include amines or other nitrogen-containing materials, which may be or include imidazole, anilenes, piperidinium, ammoniums, methylated nitrogen, or other nitrogen-containing materials or other non-metal materials, such as phosphoniums. The polymeric material may be configured to provide anionic transport across the polymeric material, while limiting or preventing cationic transport across the polymeric material.

The polymeric material may be structured or configured to afford distribution of hydroxide ions and/or water across the polymeric material to contact the reference electrode. The polymeric material may also be structured or configured to limit cations or metal ions from passing through the structure and contacting the reference electrode. For example, the polymeric material may be configured to limit zinc-containing ions, manganese-containing ions, or other metal-ions of an electrode material from passing through the polymeric material. The mechanisms by which hydroxide ions and/or water may pass through the structure may include voids or chain structures that permit permeability of water through the structure, and may permit hydroxide ions to permeate through the polymeric material. In some embodiments, although water may permeate through the polymeric structure, anions and cations from the electrode half reactions may not diffuse through the polymeric structure, and hydroxide ions may be passed across the structure via a different mechanism.

For example, the polymeric material may also include hydroxide ions associated with the polymer structure. The polymeric material may be functionalized to include hydroxide ions with the structure that may be bonded or associated with the structure. The hydroxide ions may be exchanged through the structure when hydroxide ions released during an electrode reaction contact or interact with the polymeric material. For example, as a hydroxide ion interacts with a first outer surface of the polymeric material as they are formed from a first reaction within the battery at one electrode, an internal hydroxide ion within the polymeric material may be dislocated, which may interact with an additional portion of the polymeric material. This interaction may dislocate an additional hydroxide ion, which may continue through the structure until a hydroxide ion is dislocated at a second surface of the polymeric material opposite the first outer surface, and which may be in contact with the reference electrode. Any number of dislocations may occur, including a single hydroxide release from a second surface opposite a first surface that is contacted by a hydroxide ion.

The polymeric material may be characterized by a number of properties based on its structure. For example, the polymeric material may be stable at pH conditions above 7 within the cell environment, and may be stable at conditions that may be highly basic, and may include pH conditions discussed above based on the electrolyte concentration, which may be up to or greater than a pH of 9, up to or greater than a pH of 10, up to or greater than a pH of 11, up to or greater than a pH of 12, up to or greater than a pH of 13, up to or greater than a pH of 14, up to or greater than a pH of 15, up to or greater than a pH of 16, up to or greater than a pH of 17, up to or greater than a pH of 18, or higher. The polymeric material may also be characterized by a conductivity for hydroxide ions up to or about 1 mS/cm$^2$, and may be characterized by a conductivity for hydroxide ions greater than or about 2 mS/cm$^2$, greater than or about 5 mS/cm$^2$, greater than or about 10 mS/cm$^2$, greater than or about 25 mS/cm$^2$, greater than or about 50 mS/cm$^2$, greater than or about 75 mS/cm$^2$, greater than or about 100 mS/cm$^2$, greater than or about 125 mS/cm$^2$, greater than or about 150 mS/cm$^2$, greater than or about 175 mS/cm$^2$, greater than or about 200 mS/cm$^2$, or higher.

The polymeric material may also be characterized by a diffusion ratio of different materials. For example, a diffusion ratio through the polymeric material for water or hydroxide relative to metal ions, such as zinc or manganese, may be greater than 1. The diffusion ratio, such as permeability or diffusion of water or hydroxide as a ratio with the permeability or diffusion of metal ions, may be up to or greater than 10, up to or greater than 100, up to or greater than 1,000, up to or greater than 10,000, up to or greater than 100,000, up to or greater than 1,000,000, or higher, and may be up to 1:0 in which water or hydroxide may permeate the polymeric material, but metal ions cannot pass through the polymeric material.

For all materials within a cell structure, the polymeric material may possess selectivities relative to each material. For example, the cationic backbone with anionic incorporation may provide a material characterized by a selectivity for hydroxide ions or anions generally that is higher than the selectivity for zinc cations, manganese cations, or more generally metal cations. Additionally, the materials under operation may produce metal-containing complexes, such as hydroxide complexes, and the selectivity may also extend to these or other metal-containing anions or metal-hydroxide complexes. Selectivity as used may be characterized both chemically and electrically. For example, the selectivity may be associated with ionic conductivity, which may relate to the movement of species across the polymeric material effected by an electric field. The polymeric material may provide high ion selectivity, defined as a relatively high permeability of hydroxide ions based on a concentration of hydroxide ions, and a relatively low permeability of metal-hydroxide or other anionic metal-complexes cations based on a concentration of metal cations, such as zinc and manganese, for example.

FIG. 7 illustrates an additional wire reference electrode design in which the electrode may be maintained external to the battery cell itself. As illustrated, battery cell 705 may include a wire reference electrode 710 positioned externally to the battery cell 705. Fluid communication between the battery cell 705 and the wire reference electrode 710 may be afforded by a number of devices, such as a capillary 715, allowing electrolyte from battery cell 705 to flow towards wire reference electrode 710. Wire reference electrode 710 may have an end sealed within the capillary 715 to maintain a closed system. Wire reference electrode 710 may extend to any monitoring apparatus or electrical coupling not shown, but it is to be understood that readings from wire reference electrode 710 may be taken by any number of associated devices as noted previously. Similarly, wire reference electrode 710, as well as battery cell 705, may be characterized by any of the components or materials previously described.

Capillary 715 may be any number of materials that may be inert to the interior battery cell components and materials. For example, a polymer capillary may be used that affords flexibility, and may be sealed with the battery cell. For example, exemplary battery cells may include an outer pouch or shell that may in some embodiments be a polymeric material. When capillary 715 is a similar or compatible polymeric material, sealing may be performed to bond the materials to ensure a fluid seal about the capillary extending from the battery cell. Capillary 715 may be of virtually any length to accommodate an apparatus housing the battery cell. For example, capillary 715 may extend from less than or about 1 cm to over half a meter or more in length. The capillary diameter may be less than a millimeter, and may be less than half a millimeter in embodiments. It is to be understood that at extended lengths, additional electrolyte may be incorporated within the battery cell/capillary to provide sufficient volume for operation and measurement.

Benefits of incorporating an external wire reference electrode may include the ability to exchange or replace wire reference electrodes. For example, should a wire reference electrode degrade in some way over time, including by plating on the wire, wire reference electrode 710 may be withdrawn from the capillary, and a new wire reference electrode may be incorporated with the system. Accordingly, capillary 715 may include additional items, such as a plug or sealable nozzle facilitating removal or delivery of the wire reference electrode without compromising the integrity of the system.

Additionally, capillary 715 may allow use of a wire reference electrode during production testing, while allowing removal subsequent fabrication. By incorporating the wire reference electrode, any of the testing or benefits described elsewhere may be afforded by the system. Subsequent testing, capillary 715 may be severed adjacent the battery cell 705, or recessed within the battery cell 705, followed by sealing of the battery cell. In other embodiments, capillary 715 may be maintained within the battery cell to allow lifetime testing and monitoring of the battery cell as described above.

Utilizing an external wire reference electrode may also facilitate monitoring multiple battery cells utilizing a single wire reference electrode. Turning to FIG. 8 is shown a wire reference electrode 810 fluidly coupled with multiple capillaries 815 via a valve 805. Capillary 815a may be connected with one battery cell as discussed above with regard to FIG. 7, and capillary 815b may be connected with another battery cell. Although illustrated with two capillaries allowing fluid coupling with two separate battery cells, it is to be understood that any number of battery cells may be coupled together utilizing valve 805, which may have any number of separated inlets including at least 2, at least 4, at least 8, at least 10, or more in embodiments.

An additional capillary 817, which may be similar to capillaries 815 or may be of a different material, may extend through a separate port of valve 805 that provides fluidic coupling with each inlet port through which capillaries 815 may extend. Wire reference electrode 810 may extend through capillary 817 and operate similarly to wire reference electrode 710 described above. Valve 805 may include separate chambers within the body of the valve providing switchable coupling between the port through which wire reference electrode 810 may extend or have access via capillary 817, and each individual port through which capillaries 815 extend. For example, valve 805 may be a multi-way valve allowing access between capillary 817 and one capillary 815 at a time depending on valve position. This may allow controlled connections for the wire reference electrode with different battery cells, while maintaining fluid separation between each battery cell. Without the fluid separation, intermixing of electrolyte from different battery cells may compromise measurements from each individual cell.

By utilizing reference electrodes according to embodiments of the present technology, additional diagnostic testing may be provided, as well as a capability to more accurately determine cell potential. For example, in addition to improving state-of-charge measurements as noted above, the reference electrodes may be used to separately monitor the anode and cathode to determine aspects such as degradation of the electrode. Additionally, the reference electrode may be used to determine gas generation within the cell. For example, one or more of the reference electrodes could be set to a potential to oxidize hydrogen, and thus the reference electrode may detect minute quantities of gas that may be within the cell, and which may not otherwise be noted, such as with a voltage trace. Early detection of thermal runaway may also be performed utilizing the presently disclosed designs. By utilizing one or more reference electrodes according to the present technology, battery cell health and monitoring may be performed in commercial cells in which limited space may prevent the incorporation of conventional reference electrodes.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A rechargeable battery comprising:
    an anode;
    a cathode;
    a separator positioned between the anode and the cathode;
    an electrolyte incorporated with the anode and the cathode; and
    a pseudo-reference electrode at least partially in contact with the electrolyte, wherein the pseudo-reference electrode is positioned within one of the anode active material or the cathode active material.

2. The rechargeable battery of claim 1, wherein the pseudo-reference electrode comprises a metal wire positioned within the rechargeable battery.

3. The rechargeable battery of claim 2, wherein the metal wire comprises nickel or gold.

4. The rechargeable battery of claim 2, wherein the pseudo-reference electrode is characterized by a voltage drift of less than or about 5 mV/day.

5. The rechargeable battery of claim 2, wherein the pseudo-reference electrode is characterized by thickness less than or about 0.2 mm.

6. The rechargeable battery of claim 2, wherein the pseudo-reference electrode is coated with a polymeric material.

7. The rechargeable battery of claim 6, wherein the polymeric material is configured to afford distribution of hydroxide ions across the polymeric material to contact the metal wire.

8. The rechargeable battery of claim 6, further comprising a window defined by the polymeric material to expose a portion of the metal wire.

9. The rechargeable battery of claim 1, wherein the anode comprises a zinc-containing material, and wherein the cathode comprises a manganese-containing material, a nickel-containing material, or a silver-containing material.

10. The rechargeable battery of claim 1, wherein the electrolyte comprises a solution of KOH characterized by a pH greater than or about 12.

11. A battery cell comprising:
    a housing, wherein the housing comprises a pouch of a polymeric material;
    an anode active material;
    a cathode active material;
    a separator positioned between the anode active material and the cathode active material;
    an electrolyte incorporated with the anode active material and the cathode active material; and
    a pseudo-reference electrode at least partially in contact with the electrolyte, wherein the pseudo-reference electrode is a metal electrically isolated from the anode active material and the cathode active material, and wherein the pseudo-reference electrode is incorporated within the housing.

12. The battery cell of claim 11, wherein the metal of the pseudo-reference electrode is selected from the group consisting of platinum, gold, nickel, iridium, palladium, titanium, and tungsten.

13. The battery cell of claim 11, wherein the pseudo-reference electrode is coated with a polymeric material to electrically isolate the pseudo-reference electrode from the anode active material and the cathode active material.

14. The battery cell of claim 13, wherein the polymeric material is stable at environmental conditions above or about 14 pH.

15. A battery cell comprising:
    a housing, wherein the housing comprises a pouch of a polymeric material;
    an anode active material;
    a cathode active material;
    a separator positioned between the anode active material and the cathode active material;
    an electrolyte incorporated with the anode active material and the cathode active material;

a first pseudo-reference electrode at least partially in contact with the electrolyte, wherein the first pseudo-reference electrode is positioned proximate the cathode active material;

a second pseudo-reference electrode at least partially in contact with the electrolyte, wherein the second pseudo-reference electrode is positioned proximate the anode active material; and a third pseudo-reference electrode at least partially in contact with the electrolyte, wherein the third pseudo-reference electrode is incorporated within the housing.

16. The battery cell of claim 15, wherein the first pseudo-reference electrode and the second pseudo-reference electrode are coated with a hydroxide-conducting polymer.

* * * * *